United States Patent
Liu et al.

(10) Patent No.: US 10,826,315 B2
(45) Date of Patent: Nov. 3, 2020

(54) HIGH EFFICIENCY WIRELESS CHARGER SYSTEM

(71) Applicant: Integrated Device Technology, Inc., San Jose, CA (US)

(72) Inventors: Rui Liu, Fremont, CA (US); Lijie Zhao, San Jose, CA (US)

(73) Assignee: Integrated Device Technology, Inc., San Jose, CA (US)

(*) Notice: Subject to any disclaimer, the term of this patent is extended or adjusted under 35 U.S.C. 154(b) by 0 days.

(21) Appl. No.: 16/175,393

(22) Filed: Oct. 30, 2018

(65) Prior Publication Data

US 2019/0131815 A1 May 2, 2019

Related U.S. Application Data

(60) Provisional application No. 62/579,041, filed on Oct. 30, 2017.

(51) Int. Cl.
| | |
|---|---|
| *H02J 7/00* | (2006.01) |
| *H02J 7/02* | (2016.01) |
| *H02J 50/10* | (2016.01) |
| *H04B 5/00* | (2006.01) |
| *H02J 50/12* | (2016.01) |

(52) U.S. Cl.
CPC ............ *H02J 7/025* (2013.01); *H02J 7/0071* (2020.01); *H04B 5/0037* (2013.01); *H02J 50/10* (2016.02); *H02J 50/12* (2016.02); *H02J 2207/20* (2020.01)

(58) Field of Classification Search
CPC .... H02J 50/12; H02J 7/025; H02J 7/00; H02J 7/02; H02J 2007/0059; H02J 50/10; H02J 7/0073; H02J 2207/20; H02J 7/0071; H04B 5/0037; H04B 5/0081; H04B 5/00
See application file for complete search history.

(56) References Cited

U.S. PATENT DOCUMENTS

| | | | |
|---|---|---|---|
| 2012/0050931 A1* | 3/2012 | Terry | H02H 9/04 361/91.5 |
| 2016/0268834 A1* | 9/2016 | Satyamoorthy | H02J 7/025 |

\* cited by examiner

*Primary Examiner* — Vuthe Siek
(74) *Attorney, Agent, or Firm* — Haynes and Boone, LLP

(57) ABSTRACT

In some embodiments, a wireless power charging circuit includes a wireless power receiver configured to receive wireless power from a receive coil and to produce a first voltage; an open loop capacitor divider coupled to receive the first voltage from the wireless power receiver and configured to provide a second voltage, the second voltage being reduced from the first voltage; and a linear battery charger coupled to receive the second voltage from the open loop capacitor and configured to provide a charging voltage to provide to a battery coupled to the system.

19 Claims, 4 Drawing Sheets

HIGH EFFICIENCY WIRELESS CHARGER SYSTEM

RELATED APPLICATIONS

This disclosure claims priority to U.S. Provisional Patent Application 62/579,041, filed on Oct. 30, 2017, which is herein incorporated by reference in its entirety.

TECHNICAL FIELD

Embodiments of the present invention are related to wireless charger systems.

DISCUSSION OF RELATED ART

Typically, a wireless power system includes a transmitter coil that is driven to produce a time-varying magnetic field and a receiver coil that is positioned relative to the transmitter coil to receive the power transmitted in the time-varying magnetic field. A wireless power receiver output can be set to higher voltages, such as 9V instead of 5V or 4.5V, to minimize the power loss in Rx coil (Ls) due to conduction loss. Higher input voltages, for example 9V, can result in higher efficiency switching chargers with which to charge a battery. Such a system can optimize both coil loss and conduction loss in a linear charger system.

However, there are several issues with operating a switching charger in this fashion. A switching charger operates at high frequency (2 to 4 MHz) to minimize the inductor size, which, for example, may be a 1 µH external inductor. However, higher switching frequency results in higher switching frequency, which results in the need for a larger die size. In a switching charger design with a 1 A battery charging capability, for example, half of the die size, if not more, is the control circuitry. This large die size is due to the complexity of the resulting battery charger and is combined with an expensive and large external inductor.

Therefore, there is a need to develop better methods of providing wireless power system with a switching charger.

SUMMARY

In some embodiments, a wireless power charging circuit includes a wireless power receiver configured to receive wireless power from a receive coil and to produce a first voltage; an open loop capacitor divider coupled to receive the first voltage from the wireless power receiver and configured to provide a second voltage, the second voltage being reduced from the first voltage; and a linear battery charger coupled to receive the second voltage from the open loop capacitor and configured to provide a charging voltage to provide to a battery coupled to the system.

This and other embodiments are further described below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
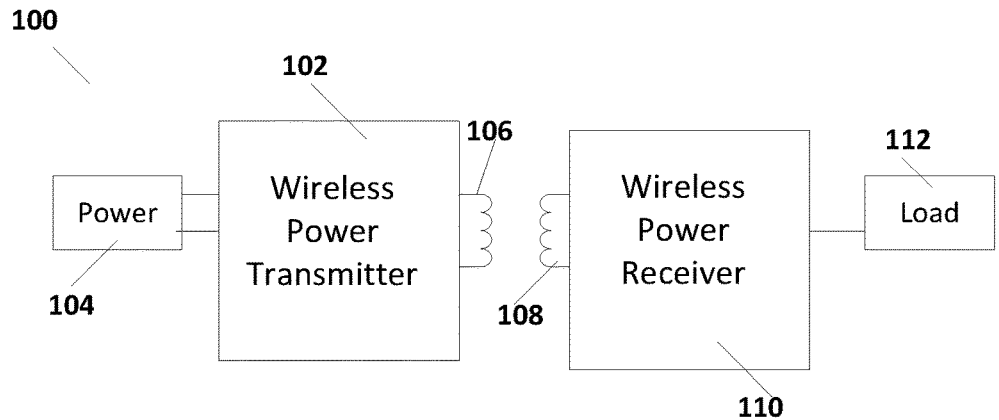
FIG. 1 illustrates a wireless power system.

FIG. 1 illustrates a system 100 for wireless transfer of power. As illustrated in FIG. 1, a wireless power transmitter 102 drives a coil 106 to produce a magnetic field. A power supply 104 provides power to wireless power transmitter 102. Power supply 104 can be, for example, a battery-based supply or may be powered by alternating current, for example 120V at 60 Hz. Wireless power transmitter 102 drives coil 106 at, typically, a range of frequencies according to one of the wireless power standards.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium, the Qi specification, a resonant inductive coupling system is utilized to charge a single device at the resonance frequency of the device. In the Qi standard, coil 108 is placed in close proximity with coil 106 while in the A4WP standard, coil 108 is placed near coil 106 along with other coils that belong to other charging devices. FIG. 1 depicts a generalized wireless power system 100 that operates under any of these standards.

As is further illustrated in FIG. 1, the magnetic field produced by coil 106 induces a current in coil 108, which results in power being received in a receiver 110. Receiver 110 receives the power from coil 108 and provides power to a load 112, which can represent a battery charger, and/or other components of a mobile device. Receiver 110 typically includes rectification to convert the received AC power to DC power for load 112. Load 112 can represent the other components of a mobile device, including processors, battery chargers, displays, etc.

Figure 2A:
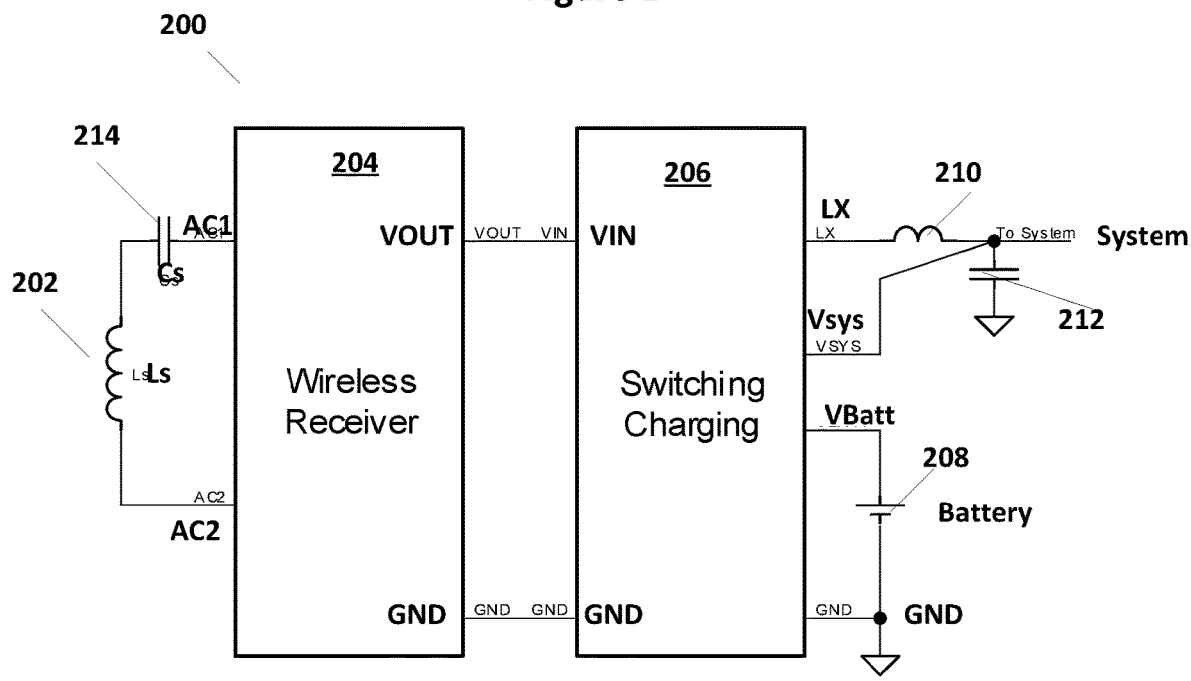
FIGS. 2A and 2B illustrate a conventional receiver.

FIG. 2A illustrates a system 200 with a wireless power receiver 204 and a switching charger 206. As illustrated in FIG. 2A, wireless receiver 204 is coupled to a tank circuit that includes receive coil 202 and a capacitor 214. The input signal across AC1 and AC2 is received by wireless receiver, which typically includes a rectifier circuit, filters, and DC processing circuits (Buck or Boost circuits) results in output of a voltage VOUT. The voltage VOUT is input as VIN to a switching charging circuit. The switching charging circuit 206 provides a battery voltage VBatt across a battery 208. Switching charging circuit 206 also outputs voltages LX and Vsys. A series coupled inductor 210 and capacitor 212 is coupled between the voltage LX and ground GND. A Vsys is provided across capacitor 212. The system voltage Vsys is output to provide further power to other components.

Figure 2B:
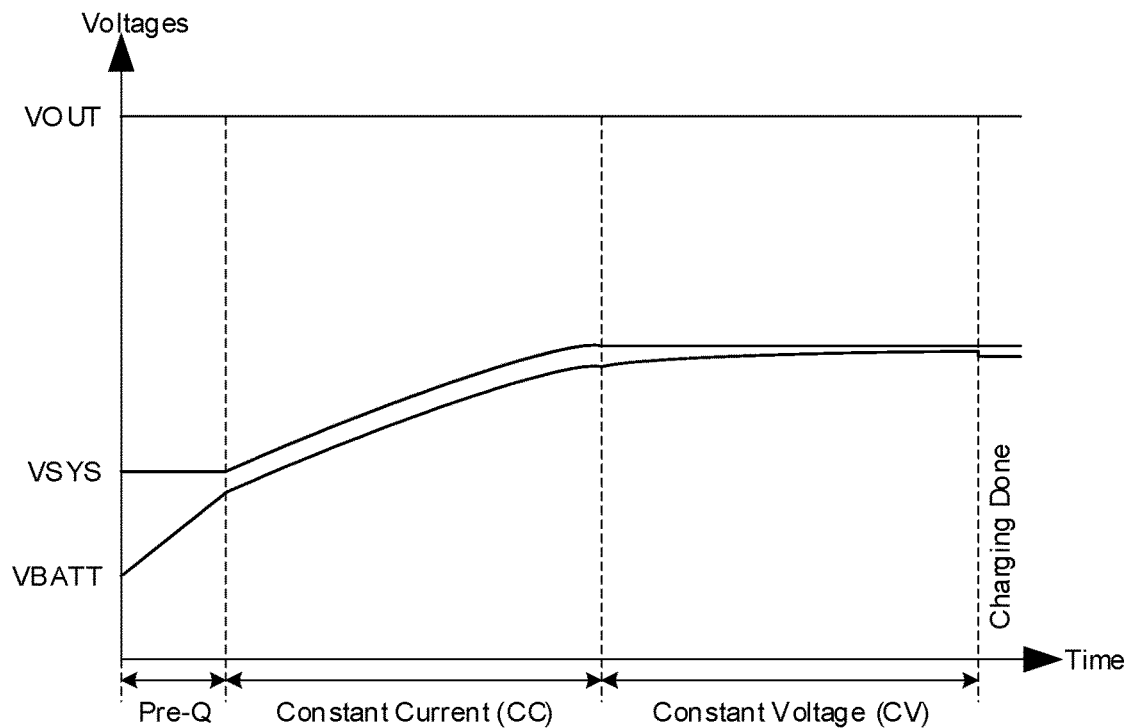

FIG. 2B illustrates the key waveforms of VOUT, VSYS, and VBATT through the charging process. Typical charging cycles for the process of charging a rechargeable battery includes a pre-charge process where the system voltage is kept at a low level for a particular period of time, or until the battery voltage VBATT reaches a particular level. The pre-charge cycle is followed by a time period of constant current charging. During the constant current period, the battery voltage and the system voltage increases in order to hold the current into the battery a constant. Following the constant current process, then a period of constant voltage period occurs. During the constant voltage period, the system voltage is held constant and the current and battery voltage vary accordingly until the battery voltage reaches a charged level and the current can be reduced to a minimum. FIG. 2B illustrates the voltages VOUT, VSYS, and VBATT during the pre-charge, the constant current, and the constant voltage process of the battery charge cycle of the conventional system 200.

In a particular example, conventional system 200 can include a wireless power receiver output (VOUT) that can be set to higher voltage, such as 9V instead of 5V or 4.5V, to minimize the power loss in Rx coil 202 (Ls) due to conduction loss. Switching charger 206 can provide high efficiency to charge battery with high input voltages, for example 9V. Such a system 200 can optimize both coil loss and conduction loss in a linear charger system.

However, this system, even at higher voltages, has several challenges. Switching charger 206 operates in high frequency (2 to 4 MHz) to minimize the inductor size (1 uH inductor) of inductor 210. However, higher switching frequency results in higher switching frequency. Such a system would also have a large die size. In a switching charger design with 1 A battery charging capability, half of die size, if not more, is the control circuitry due to the complexity of a battery charger. Plus, these systems are expensive and use a large external inductor 210.

Embodiments of the invention include an open loop capacitor divider connected between a wireless power receiver (Rx) and a linear charger. The output voltage Vout of the wireless power receiver is not constant and is operated in such a scheme that it tracks the battery voltage, VBATT, such that it is slightly above (200 mV, for example) twice of battery voltage. In some cases, slightly above can be as much as 500 mV.

As such, a system according to some embodiments of the present invention includes a wireless power receiver, an open loop capacitor divider that is between the output of the wireless power receiver and a linear battery charger. The linear charge is coupled to the output of the capacitor divider. A controller controls the wireless power receiver, the capacitor divider, and the linear battery charger to charge a battery coupled to the system.

The wireless power receiver provides power to capacitor divider, which divides the output voltage of the wireless power receiver, VOUT, by a factor. In some embodiments, the factor may be approximately half (e.g., the output voltage of the capacitor divider is about ½ that of the output voltage VOUT of the receiver). The linear charger takes the power from the capacitor divider and charges the battery. The controller controls the system such that the output voltage of the wireless power receiver is 200 mV or less above twice of the battery voltage or minimum system voltage, whichever is higher, to achieve high efficiency operation in the wireless battery charger system.

Figure 3A:
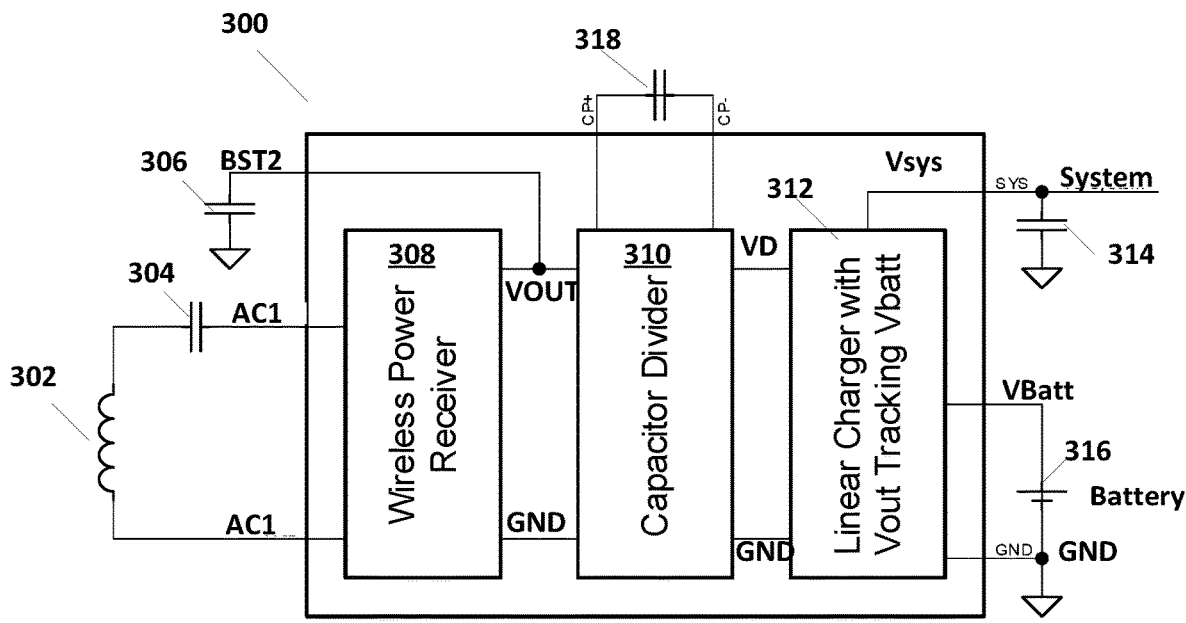
FIGS. 3A and 3B illustrate a receiver according to some embodiments of the present invention.

FIG. 3A illustrates a wireless charging system 300 according to some embodiments of the present invention. Charging system 300 includes a wireless power receiver 308, a capacitor divider 310, and a linear charger 312. Wireless power receiver 308 is coupled to inputs AC1 and AC2, which is coupled across series connected receive coil 302 and capacitor 304. The output voltage VOUT, which is also coupled to a capacitor 306, is input to capacitor divider 310. Capacitor divider 310 receives the voltage VOUT from wireless power receiver 308 and provides a voltage VD to linear charger 312. Capacitor divider 310 is coupled to an external capacitance 318. Capacitive divider 310 illustrates an open loop capacitor divider that is connected between wireless power receiver (Rx) 308 and a linear charger 312.

Linear charger 312 provides a voltage VBatt to be applied across battery 316 and a system voltage VSYS that is coupled across a capacitor 314. The voltage VOUT from wireless power receiver 308 is not constant, as it is in conventional systems. Receiver 308 is operated in such that VOUT tracks the battery voltage, VBATT. In some embodiments, for example, VOUT is arranged such that it is slightly above (200 mV above, for example) twice the battery voltage VBATT.

Figure 3B:
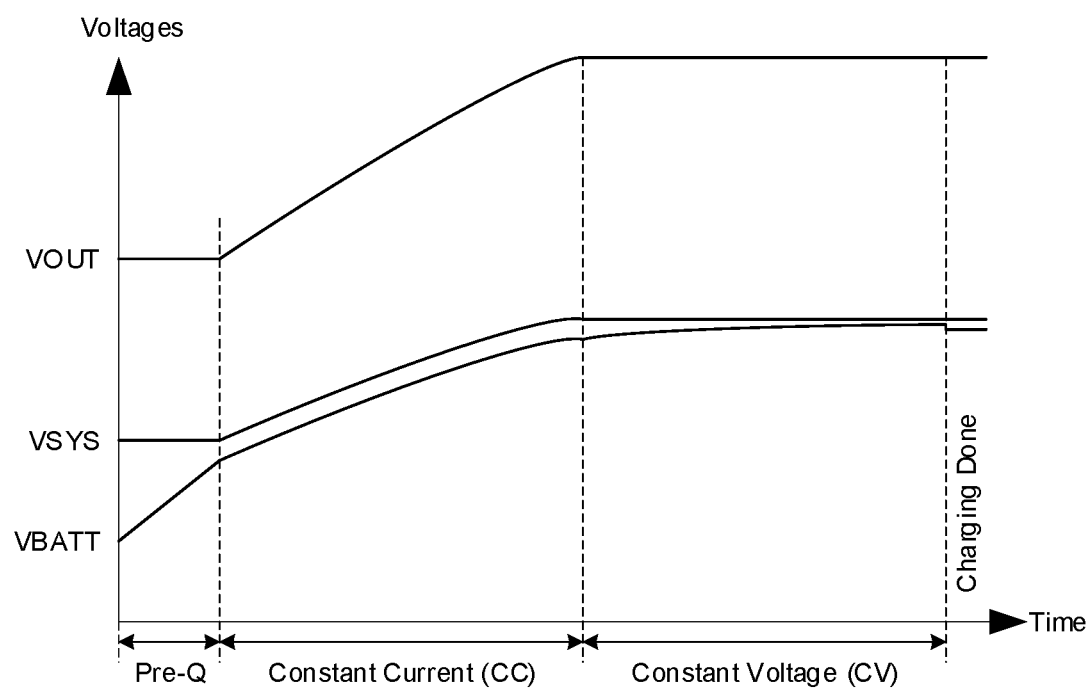

FIG. 3B illustrates the voltage VOUT, Vsys, and VBatt during the charging cycle. As is illustrated in FIG. 3B, VOUT is arranged through the charging cycle to track the battery voltage VBATT.

System 300 according to some embodiments has several advantages. The output current of wireless power receiver 308, for example, can be half of the charger input current, thus reducing the coil conduction loss by up to 75%. Furthermore, linear charger 312 may result in smaller die sizes and fewer external components. Additionally, the input voltage VD to linear charger 312 can be only about 100 mV (or less) higher than the battery voltage VBATT. This provides for a very efficient operation of system 300. As an additional advantage, capacitor divider 310 is an open loop system and can have a 50% operation duty cycle, resulting in a small die design. Capacitor divider 310 in some embodiments can achieve high efficiency (95%) at, for example, a 50% duty cycle.

As illustrates in FIGS. 3A and 3B, a simple open loop capacitor divider 310 is provided to make the output voltage VOUT of a wireless power receiver 308 always about twice of the battery output voltage VBATT of the linear charger 312. The output voltage of the wireless power receiver 308 is controlled such that the output voltage Vout is only 200 mV (or less) above twice the battery voltage VBATT or minimum system voltage, whichever, is higher, resulting high efficiency operation of the wireless battery charging system 300. Consequently, the input voltage VD to linear charger 312 is approximately half that of the output voltage of receiver 308, VOUT.

Figure 4:
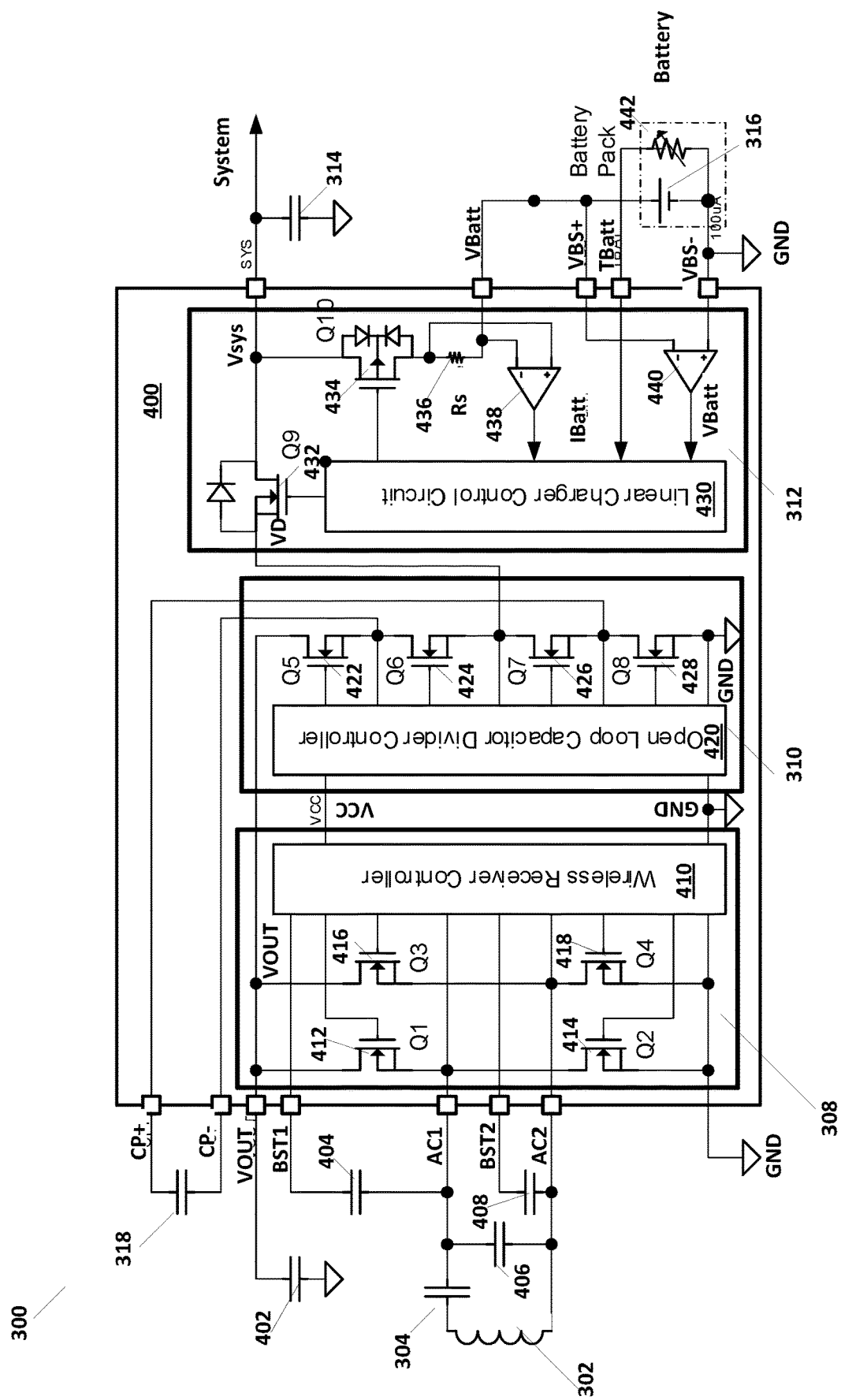
FIG. 4 illustrates the receiver illustrated in FIG. 3A is more detail.
These figures are further described in detail below.

FIG. 4 illustrates a more detailed embodiment of system 300 according to some embodiments of the present invention. As is illustrated in FIG. 4, and previously illustrated in FIG. 3A, system 300 includes a receiver 308, a capacitor divider 310, and a linear charger 312. As is further illustrated in FIG. 4, receiver 308, capacitor divider 310, and linear charger 312 can be formed on a single integrated circuit (IC) 400. As illustrated in FIG. 4, transmit coil 302 is coupled in series with a capacitor 304 across inputs AC1 and AC2. In some embodiments, a capacitor 406 may be coupled across the series coupled transmit coil 302 and capacitor 304.

Other inputs/outputs to IC 400 include BST1, BST2, VOUT, CP−, CP+, Vsys, VBatt, VBS+, TBatt, VBS−, and GND. BST1 is coupled through an external capacitor 404 to AC1. BST2 is coupled through an external capacitor 408 to AC2. VOUT is coupled through external capacitor 402 to ground GND. An external capacitor 318 is coupled between CP+ and CP−. Vsys is coupled to ground through external capacitor 314 and provides the voltage output to system components outside of IC 400. VBatt is coupled to the positive side of battery 316, the negative side of which is coupled to ground GND. VBS+ and VBS− are coupled across battery 316. As is illustrated in FIG. 4, battery 316 may be part of a battery pack that also includes a thermistor 442 for measuring the temperature of the battery pack. Thermistor 442 is coupled between TBatt and ground GND.

Receiver 308 includes a wireless receiver controller 410 coupled to a full bridge rectifier formed by transistor 412, transistor 414, transistor 416, and transistor 418. As is illustrated in FIG. 4, transistor 412 and transistor 414 are coupled in series between the voltage VOUT and Ground. The node between transistor 412 and transistor 414 is coupled to AC1. Similarly, transistors 416 and 418 are coupled between VOUT and Ground and the node between transistors 416 and 418 is coupled to AC2. The gates of transistor 412, transistor 414, transistor 416, and transistor 418 are coupled to a wireless receiver controller 410. Wireless receiver controller 410 controls the gates of transistors 412, 414, 416, and 418 to generate the voltage VOUT from the input AC voltages AC1 and AC2. AC1 and AC2 are generated by receive coil 302 in response to the receipt of wireless power.

Wireless power controller 410 is coupled to AC1, AC2, BST1, and BST2, which are used by wireless power controller 410 to affect the control signals to the gates of transistors 412, 414, 416, and 418. Wireless receiver controller 410 may also receive a control voltage VCC, which is also used to provide feedback to control generation of the voltage VOUT. In particular, wireless power controller 410 controls the output voltage VOUT according to generation of the system voltage Vsys. In many cases, as discussed above, VOUT is generated to be a voltage level slightly above twice that of the system voltage Vsys.

Receiver 308 generates the voltage VOUT, which is provided to capacitor divider 310. Capacitor divider 310 includes an open loop capacitor divider controller 420 coupled to series coupled transistors 422, 424, 426, and 428. Transistors 422, 424, 426, and 428 are coupled in series between VOUT and GND. The gates of transistors 422, 424, 426, and 428 are controlled by controller 420. Transistor 422 is coupled to VOUT. The node between transistor 422 and 424 is coupled to external capacitor 318 through CP−. The node between transistor 424 and transistor 426 provides the voltage VD, which as discussed below can be coupled to provide the system voltage Vsys. The node between transistor 426 and transistor 428 is coupled to external capacitor 318 through CP+. Transistor 428 is then coupled to ground GND.

Capacitor divider controller 420 receives input voltages from CP−, CP+, VD, and GND. Controller 420 can operate transistors 422, 424, 426, and 428 in order to generate the voltage VD. Controller 420 also generates the control voltage VCC for wireless receiver controller 410 according to the voltage VD. In operation, controller 420 turns transistors 422 and 428 on to charge capacitor 318 and turns transistors 424 and 426 on to generate voltage VD. In some embodiments, transistors 422 and 428 can be turned on alternately with transistors 424 and 426 to operate capacitive divider 310. As discussed above, controller 420 can operate transistors 422, 424, 426, and 428 at a 50% duty cycle, which allows system 300 to achieve a high efficiency.

The voltage VD is supplied to linear charging circuit 312. As illustrated in FIG. 4, linear charger 312 includes a control circuit 430. The voltage VD is coupled to VSYS through a transistor 432. The gate of transistor 432 is controlled by control circuit 430. Control circuit 430 also provides a control signal to the gate of transistor 434, which provides the voltage Vsys to the battery voltage VBatt. A resistor Rs 436 is coupled between transistor 434 and the battery voltage VBatt. Voltage levels across resistor 436 is provided to an amplifier 438, which provides a signal related to the battery charge current IBatt to control circuit 430. The temperature signal from thermistor 442 TBatt is also provided to controller 420. Additionally, the voltages from VBS_ and VBS− are input to an amplifier 440 to provide a voltage VBatt that is input to control circuit 430.

Control circuit 430, therefore, receives the inputs IBatt, TBatt, and VBatt and controls transistors 432 and 434 to provide the system voltage Vsys and VBatt. In particular, Vsys can be formed by charging capacitor 314 through transistor 432. Transistor 434 couples Vsys to VBatt. As is discussed above, control circuit 430 can be operated to operate in pre-charge mode, constant current mode, and constant voltage mode, as discussed above and illustrated in FIG. 3B.

Receiver control circuit 410, capacitor divider controller 420, and linear charge control circuit 430 may include a microcontroller configured to execute instructions for performing the functions of each control circuit. A microcontroller can include a microprocessor and memory (both volatile and non-volatile) that holds data and instructions. Although in some embodiments, each of control circuit 410, divider controller 420, and charge control circuit 430 can include separate microcontrollers, in other embodiments a single microcontroller may be used to perform each of their functions. In some embodiments, some or all of the functions performed by controller 410, controller 420, and controller 430 may be performed by hardware.

Consequently, as discussed above, in some embodiments a wireless power charging system is formed with a wireless power receiver, an open loop capacitor divider that is connected to the output of the wireless power receiver, and a linear battery charger that is connected to the output of the said capacitor divider and coupled such that a battery coupled to the system can be charged.

As discussed above, the wireless power receiver provides power to the capacitor divider. The capacitor divider divides the output voltage of the wireless power receiver, VOUT, substantially by half. The linear charger takes the power from the capacitor divider and charges the battery.

In some embodiments, each of the wireless power receiver, the capacitor divider, and the linear charge includes controllers. The controllers control the system such that the output voltage of the wireless power receiver is approximately twice the battery voltage. In some embodiments, the output voltage of the wireless power receiver is 200 mV (or less) above twice of the battery voltage or minimum system voltage, whichever is higher, to achieve high efficiency operation in the wireless battery charger system.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power charging system, comprising:
 a wireless power receiver configured to receive wireless power from a receive coil and to produce a first voltage, wherein the wireless power receiver comprises
 a rectifier circuit coupled to receive an AC power from a receive coil, and
 a receiver control circuit coupled to the rectifier circuit and configured to provide control signals to the rectifier circuit to produce the first voltage, the first voltage being controlled in response to the second voltage;

an open loop capacitor divider that includes a capacitor, the divider being coupled to receive the first voltage from the wireless power receiver and periodically couple the first voltage to the capacitor to provide a second voltage, the second voltage being reduced from the first voltage; and a linear battery charger coupled to receive the second voltage from the open loop capacitor and configured to provide a charging voltage to provide to a battery coupled to the system.

2. The system of claim 1, wherein the rectifier circuit includes a first rectifier transistor coupled in series with a second rectifier transistor, the first rectifier transistor coupled to the first voltage and the second rectifier transistor coupled to ground, wherein a first rectifier node between the first rectifier transistor and the second rectifier transistor is configured to receive a voltage AC1 from a first side of the receive coil through a capacitor; and a third rectifier transistor coupled in series with a fourth rectifier transistor, the third rectifier transistor coupled to the first voltage and the fourth rectifier transistor coupled to ground, wherein a second rectifier node between the third rectifier transistor and the fourth rectifier transistor is configured to receive a voltage AC2 from a second side of the receiver coil, wherein gates of the first transistor, the second transistor, the third transistor, and the fourth transistor are coupled to be driven by the receiver control circuit to produce the first voltage from the voltage AC1 and the voltage AC2.

3. The system of claim 2, wherein the receiver control circuit receives a control signal and operates the first transistor, the second transistor, the third transistor, and the fourth transistor to generate the first voltage according to the control signal.

4. The system of claim 3, wherein the control signal is related to the second voltage.

5. A wireless power charging system, comprising:

a wireless power receiver configured to receive wireless power from a receive coil and to produce a first voltage;

an open loop capacitor divider coupled to receive the first voltage from the wireless power receiver and configured to provide a second voltage, the second voltage being reduced from the first voltage, the open-loop capacitor divider comprising a divider controller, and a transistor array that includes a first divider transistor, a second divider transistor, a third divider transistor, and a fourth divider transistor coupled by their gates to the divider controller, the first divider transistor is coupled in series with the second divider transistor that is coupled in series with the third divider transistor that is coupled in series with the fourth divider transistor, the array being coupled between a first voltage and ground, wherein a first divider node between the first divider transistor and the second divider transistor is configured to couple with a first side of an external capacitor and a second divider node between the third divider transistor and the fourth divider transistor is coupled to a second side of the external capacitor, and wherein a third divider node between the second divider transistor and the third divider transistor provides the second voltage that is a divided voltage from the first voltage; and a linear battery charger coupled to receive the second voltage from the open loop capacitor and configured to provide a charging voltage to provide to a battery coupled to the system.

6. The system of claim 5, wherein the divider controller operates the array at a 50% duty cycle.

7. The system of claim 5, wherein the first divider transistor and the fourth divider transistor are turned on to charge the external capacitor and the second divider transistor and the third divider transistor is turned on to provide the voltage VD.

8. The system of claim 5, wherein the wireless power receiver, the open loop capacitor divider, and the linear battery charger are formed on a single integrated circuit.

9. The system of claim 5, wherein the wireless power receiver, the open loop capacitor divider, and the linear battery charger are each controlled by a microcontroller.

10. A wireless power charging system, comprising:

a wireless power receiver configured to receive wireless power from a receive coil and to produce a first voltage;

an open loop capacitor divider that includes a capacitor, the divider being coupled to receive the first voltage from the wireless power receiver and periodically couple the first voltage to the capacitor to provide a second voltage, the second voltage being reduced from the first voltage; and a linear battery charger coupled to receive the second voltage from the open loop capacitor and configured to provide a charging voltage to provide to a battery coupled to the system, the linear battery charger comprising a charger control circuit, a first transistor with a gate coupled to the charger control circuit, the first transistor receiving the first voltage and providing a system voltage, and a second transistor with a gate coupled to the first voltage to receive the system voltage and providing a battery voltage, a gate of the second transistor coupled to the charger control circuit.

11. The system of claim 10, wherein the system is configured to supply the battery voltage to a battery.

12. The system of claim 10, further including a current sensor coupled between the second transistor and a battery coupled to the system to provide an indication of battery current to the charger control circuit.

13. The system of claim 10, further including a voltage sensor to provide a voltage across a battery to the charger control circuit.

14. The system of claim 10, further including a temperature sensor coupled to provide an indication of battery temperature to the charger control circuit.

15. The system of claim 10, wherein the charger control circuit controls the first transistor and the second transistor in response an indication of a battery current and a battery voltage to provide a battery voltage.

16. A method of charging a battery, comprising:

receiving wireless power in a wireless power receiver;

producing a first voltage in the wireless power receiver;

dividing the first voltage in an open loop capacitor divider to produce a second voltage wherein dividing the first voltage in the open loop capacitor divider includes periodically coupling a capacitance to the first voltage to produce the second voltage; and producing a battery voltage that can be supplied to charge a battery from the second voltage.

17. The method of claim 16, wherein producing the first voltage includes operating a rectifier circuit to produce the first voltage to track the second voltage.

18. The method of claim 16, wherein producing the battery voltage includes providing the battery voltage according to a charging stage.

19. The method of claim 18, wherein the charging state includes one of a precharge, a constant current, and a constant voltage stage.

* * * * *